(12) United States Patent
Wong et al.

(10) Patent No.: US 12,025,770 B2
(45) Date of Patent: Jul. 2, 2024

(54) SYSTEM FOR MONITORING STABILITY OF TREES

(71) Applicant: Logistics and Supply Chain MultiTech R&D Centre Limited, Pok Fu Lam (HK)

(72) Inventors: Kwong Yeung Simon Wong, Pok Fu Lam (HK); Ho Lam, Pok Fu Lam (HK); Wing Pong Ngai, Pok Fu Lam (HK); Shiu Kee Luk, Pok Fu Lam (HK); Chun Hung Cheng, Pok Fu Lam (HK); Kwong Tim Chan, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 0 days.

(21) Appl. No.: 17/709,729

(22) Filed: Mar. 31, 2022

(65) Prior Publication Data

US 2023/0314656 A1    Oct. 5, 2023

(51) Int. Cl.
*G01W 1/10* (2006.01)
*G01M 1/14* (2006.01)
(Continued)

(52) U.S. Cl.
CPC .............. *G01W 1/10* (2013.01); *G01M 1/14* (2013.01); *G01W 1/02* (2013.01); *G01W 1/04* (2013.01); *G01W 1/06* (2013.01)

(58) Field of Classification Search
CPC ........... G01W 1/10; G01W 1/02; G01W 1/04; G01W 1/06; G01M 1/14
See application file for complete search history.

(56) References Cited

U.S. PATENT DOCUMENTS

| | | | | |
|---|---|---|---|---|
| 2019/0132656 A1* | 5/2019 | Struhsaker | .............. | H04L 67/12 |
| 2021/0034866 A1* | 2/2021 | Appel | .................... | G06V 20/20 |
| 2022/0198641 A1* | 6/2022 | Gordon | ................... | G06F 18/24 |

FOREIGN PATENT DOCUMENTS

| | | | | | |
|---|---|---|---|---|---|
| CN | 111238944 | A | * | 6/2020 | ............. G01N 3/06 |
| ES | 2687108 | B2 | * | 8/2020 | ............. A01G 23/00 |
| JP | 2020003900 | A | * | 1/2020 | |

OTHER PUBLICATIONS

Abbas et al.(Tree tilt monitoring in rural and urban landscapes of Hong Kong using smart sensing technology, Trees, Forests and People, vol. 2, Dec. 2020, 100030, ISSN 2666-7193, https://doi.org/10.1016/j.tfp.2020.100030) (Year: 2020).*

(Continued)

*Primary Examiner* — Manish S Shah
*Assistant Examiner* — Christian T Bryant
(74) *Attorney, Agent, or Firm* — Renner, Kenner, Greive, Bobak, Taylor & Weber

(57) ABSTRACT

A system (100) for monitoring stability of trees (10) in an area includes a server (101), one or more sensor modules (102, 202) being attached to each of the trees (10) in a network of trees, configured for obtaining tilt angle data pertaining to inclination of at least a portion of the tree (10), and relaying the tilt angle data to the server (101), a weather observing device (103, 203) connected to the server (101), for obtaining localized environmental variables representing a local weather condition in the area, and a monitoring platform (20) connected with the server (101), configured for storing and processing the data. The system is configured for monitoring, based on the data and the environmental variables, the tilt angle data of each of the trees (10), and identifying one or more abnormalities of one or more of the trees (10), and indicating through the monitoring platform (20) the one or more abnormalities.

20 Claims, 5 Drawing Sheets

(51) Int. Cl.
  *G01W 1/02* (2006.01)
  *G01W 1/04* (2006.01)
  *G01W 1/06* (2006.01)

(56) References Cited

OTHER PUBLICATIONS

Yang et al. ("A Review of Dynamic Tree Behaviors: Measurement Methods on Tree Sway, Tree Tilt, and Root-Plate Movement," Forests, vol. 12, No. 3, p. 379, Mar. 2021, doi: 10.3390/f12030379) (Year: 2021).*

* cited by examiner

SYSTEM FOR MONITORING STABILITY OF TREES

FIELD OF THE INVENTION

The present invention relates to a system for monitoring stability of trees. Particularly, the present invention pertains to a system for monitoring stability of trees under adverse weather conditions in identifying tree failures.

BACKGROUND

Trees are indispensable elements in urbanized cities. Decaying or damaged trees are the primary causes of tree failures. Tree failure is a structural deterioration or breakage of any part of a tree, including the roots, trunk, or canopy branches. The chances for trees to fail relates to various biomechanical and physical factors. In an urbanized area, tree failures could pose serious dangers to the public. Furthermore, during adverse weather conditions, tree failures would not only pose public hazards, fallen tree trunks on passage ways cause inconveniences for road users and pedestrians. For example, fallen trees on roads are often reported only after a traffic jam is resulted. In order to deal with the problem, it is vital to understand the way a tree can fail, why it will fail, and identify any warning sign for tree failures. Presently, tree assessments vary due to differences in experience, training, and opinions of individual assessors. This calls for the need for a more effective method to identify tree failures as quickly as possible, and assess the risk and hazardousness of trees, in particular, during adverse weather conditions.

SUMMARY OF THE INVENTION

The present invention proposes to alleviate or to at least mitigate some of the above shortcomings by providing tree monitoring and management system. According to a first aspect of the present invention, there is provided system for monitoring stability of trees, comprising:
- a server;
- one or more sensor modules being attached to each of the trees, configured for obtaining tilt angle data pertaining to inclination of at least a portion of the said tree and relaying the tilt angle data to the server;
- a weather observing device connected to the server, for obtaining localized environmental variables representing a local weather condition in the area; and
- a monitoring platform connected with the server, configured for storing and processing the data;
- wherein the system is configured for monitoring, based on the tilt angle data and the environmental variables, the inclination of the trees, and identifying one or more abnormalities and tree failures for one or more of the trees, and indicating through the monitoring platform the one or more abnormalities and tree failures.

In an embodiment, the one or more abnormalities of one or more of the trees comprise one or more of excessive swing, excessive horizontal or vertical displacement, excessive tilt or excessive vibration.

In an embodiment, the weather observing device comprises one or more sensors for determining one or more of the following: barometric pressure, humidity of air, wind speed, wind direction and temperature.

In an embodiment, the one or more sensor modules are interconnected and connected with a data receiver based on Narrowband Internet of Things protocol (NB-IoT).

In an embodiment, the one or more sensor modules are connected with the at least one LoRa gateway through a Low Power Wide Area Networking protocol (LoRaWAN).

In an embodiment, the LoRa gateway and the weather observing device are integrated into a single device.

In an embodiment, the one or more sensor modules are self-powered by one or more onboard solar panels and a non-rechargeable battery.

In an embodiment, the weather observing device is self-powered by one or more onboard solar panels and a rechargeable battery.

In an embodiment, each of the one or more sensor module comprises one or more of the following sensors: acceleration sensors, and magnetic field sensors.

In an embodiment, one of the sensor modules is attached to a first portion of a said tree, and another of the sensor modules is attached to a second portion of the said tree.

In an embodiment, the first portion is an upper portion of the trunk of the said tree, and the second portion is a lower portion of the trunk, the system is configured for determining a tree failure by comparing the tilt angle data obtained by the first and second portions of the said tree.

In an embodiment, each of sensor modules comprises a 9-axis sensor for collecting data pertaining to one or more of the following: acceleration, magnetic orientation, and angular velocity.

In an embodiment, the system is configured for determining a direction of fall according to the tilt angle data and magnetic orientation with respect to a tree failure.

In an embodiment, the system is configured for indicating one or more alerts through the monitoring platform in an event that one or more tree failures are determined.

In an embodiment, the system is configured for indicating one or more graphical representations of one or more tree failures according to the direction of fall determined based on the positioning data received from the one or more sensor modules.

In an embodiment, the system is configured to obtain the tilt angle data from the one or more sensor modules based on a time interval, the system shortens the time interval if one or more of the environmental variables exceed one or more thresholds.

In an embodiment, the system is configured for issuing one or more warnings for potential tree hazards through the monitoring platform in an event that one or more abnormalities are determined.

In an embodiment, the LoRa gateway connects to the internet utilizing LTE network communication protocol.

In an embodiment, the monitoring platform is accessible by an Internet enabled tablet pc, laptop or smartphone.

In an embodiment, the server is configured for storing the tilt angle data obtained for each of the trees for forming a big data database for performing big data analysis on tree failures with respect to local weather conditions.

The figures herein are for illustrative purposes only and are not necessarily drawn to so descale.

DESCRIPTION OF THE PREFERRED EMBODIMENTS

The following clearly and completely describes the technical solutions in the embodiments of the present invention with reference to the accompanying drawings. Apparently, the described embodiments are merely some but not all of the embodiments of the present invention. All other embodiments based on the embodiments of the present invention and obtained by a person of ordinary skill in the art without investing creative efforts shall fall within the scope of the present invention.

Figure 1:
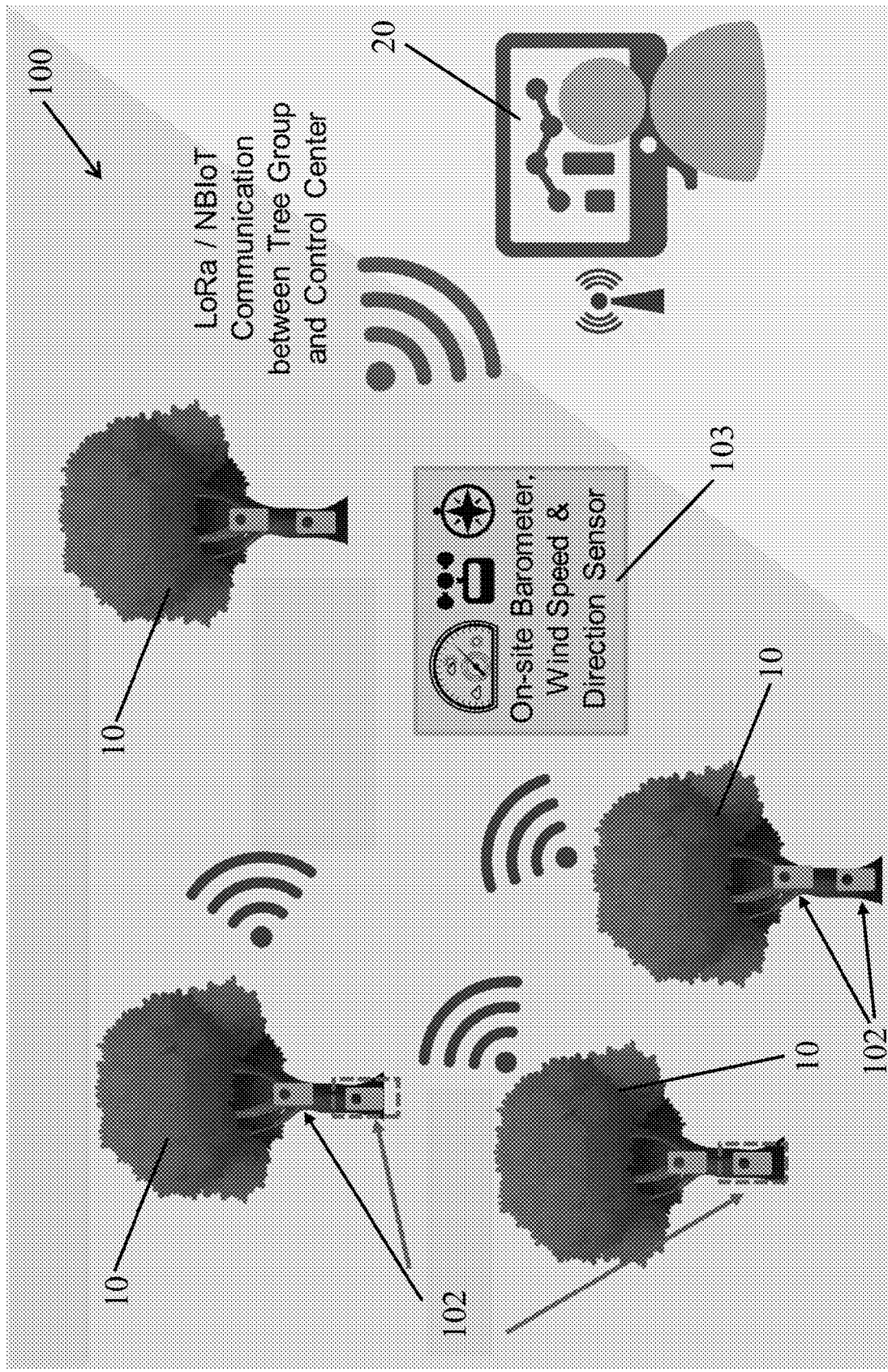
FIG. 1 shows a diagram of the system according to the prevention invention, covering an area containing a network of trees.

FIG. 1 shows a diagram of a system 100 for monitoring of trees according to an embodiment of the present invention. The system 100 comprising a server 101, one or more sensor modules 102, the one or more sensor modules 102 being attached to one or more trees 10 and configured for obtaining various data pertaining to the displacement of the trees, such as tilt angle data, which indicates the inclination of at least a portion of the one or more trees 10. The system 100 provides a monitoring platform 200 connected to the server 101 for accessible by a management personnel. According to the present invention, the system 100 is configured for monitoring, based on the tilt angle data, the inclination of the one of more trees 12, identifying one or more abnormalities for one or more trees 10, and indicating through the monitoring platform 200 the one or more abnormalities.

Figure 3:
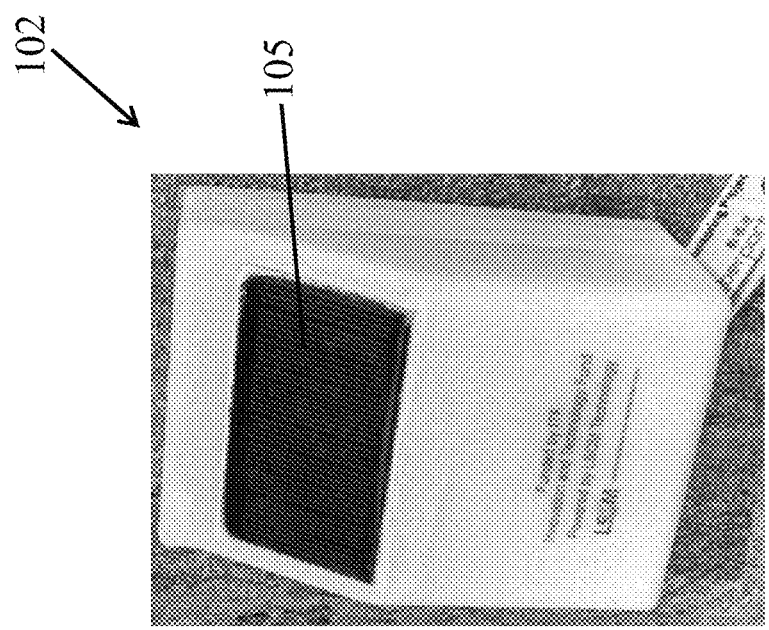
FIG. 3 shows an exemplary arrangement of a sensor module of the system according to FIG. 1 and FIG. 2.

The system may be used for monitoring a group or a network of trees 10 within several specific areas. In an example, a network of trees may include a number of trees 10 within a region as shown in FIG. 1. For instance, the region may be defined based on the transmission range of the sensor modules 102. Each of the trees 10 may be provided with one or more sensor modules 102 mounted on their trunks 11. As shown, two sensor modules 102 may be used to monitor the degree of tilting of the trunk 11, i.e., the tilting of the upper trunk with respect to the tilting of the lower trunk. By mounting a sensor module at an upper and a lower portion of the trunk, the readings of the two sensor modules 102 can be obtained and analysed by the monitoring platform for determining tilting characteristics of the tree 10, including its tilting angle and direction of tilting. Preferably, each of the sensor modules 102 may include a 9-axis sensor. A 9-axis sensor adds information from a 3-axis magnetometer to the gyroscope and accelerometer. The magnetometer measures magnetic fields, delivering a fixed point of reference (Earth's magnetic field). This data can be incorporated with the gyroscope and accelerometer data to deliver absolute heading: Not only how many degrees heading have changed, but its relation to magnetic north. Advantageously, the 9-axis sensor allows for the capturing of nine distinct types of motion or orientation related data: 3 degrees each of acceleration, magnetic orientation, and angular velocity. Adopting a 9-axis sensor in each of the sensor modules 102 can provide the system 100 the capabilities of determining the magnitude of acceleration, the angle of acceleration and the direction of acceleration of the portion of the tree relative to the Earth's magnetic field. Thus, a 9-axis sensor equipped sensor module 102 would be able to determined its orientation in terms of general cardinal directions or compass directions. The 9-axis sensor can therefore provide useful information for the system to determine a number of inclination characteristics for the trees 10 which may be affected by wind speed, wind direction and other environmental variables. According to an embodiment, each of the sensor modules 102 may be self-powered by one or more solar panels 105, as shown in FIG. 3. Each of the sensor modules 102 further includes an onboard battery for maintaining a supply of power in absent of any solar power, i.e., during overcast weather and night times. Preferably, the sensor modules 102 may be configured to switch between solar powered mode and battery powered mode automatically according to availability and sufficiency of solar power.

Each of the sensor modules 102 includes a wireless communication unit for communicating with the server 101. Preferably, the wireless communication unit may utilize low power wide area (LPWA) technology standards such as Narrowband Internet of Things (NB-IoT). NB-IoT is a standards-based low power wide area radio technology developed to enable a wide range of IoT devices and services. Advantageously, NB-IoT can significantly improve power consumption of individual remote devices, system capacity and spectrum efficiency, especially in deep coverage. Alternatively, the wireless communication units in the sensor modules may adopt the LoRaWAN™ which is also a low power wide area network (LPWAN) radio technology standard. LoRaWAN™ is a low power IoT protocol that comprises the LoRa radio technology, allowing for an open, reliable, and economical network deployment. By contrast, NB-IoT is a licensed LTE radio technology offering low latency and improved security, but is a relatively less cost-effective solution. LoRaWAN™ is an open protocol offered by the LoRa alliance that uses unlicensed spectrum, allowing users to set up their own networks at a relatively lower cost. Additionally, lower power consumption comparing to NB-IoT makes LoRaWAN™ a superior and more cost-effective choice for the system according to the present invention. Specifically, a LoRaWAN™ enabled sensor module can provide a longer battery life, which can substantially reduce the number of maintenances or services, such as battery replacements, required to be performed on a mass number of sensor modules. Preferably, the battery used in a LoRaWAN™ enabled sensor module is of the non-rechargeable type having a low self-discharge rate which helps to prolong the service life of each of the sensor modules 102.

Figure 2:
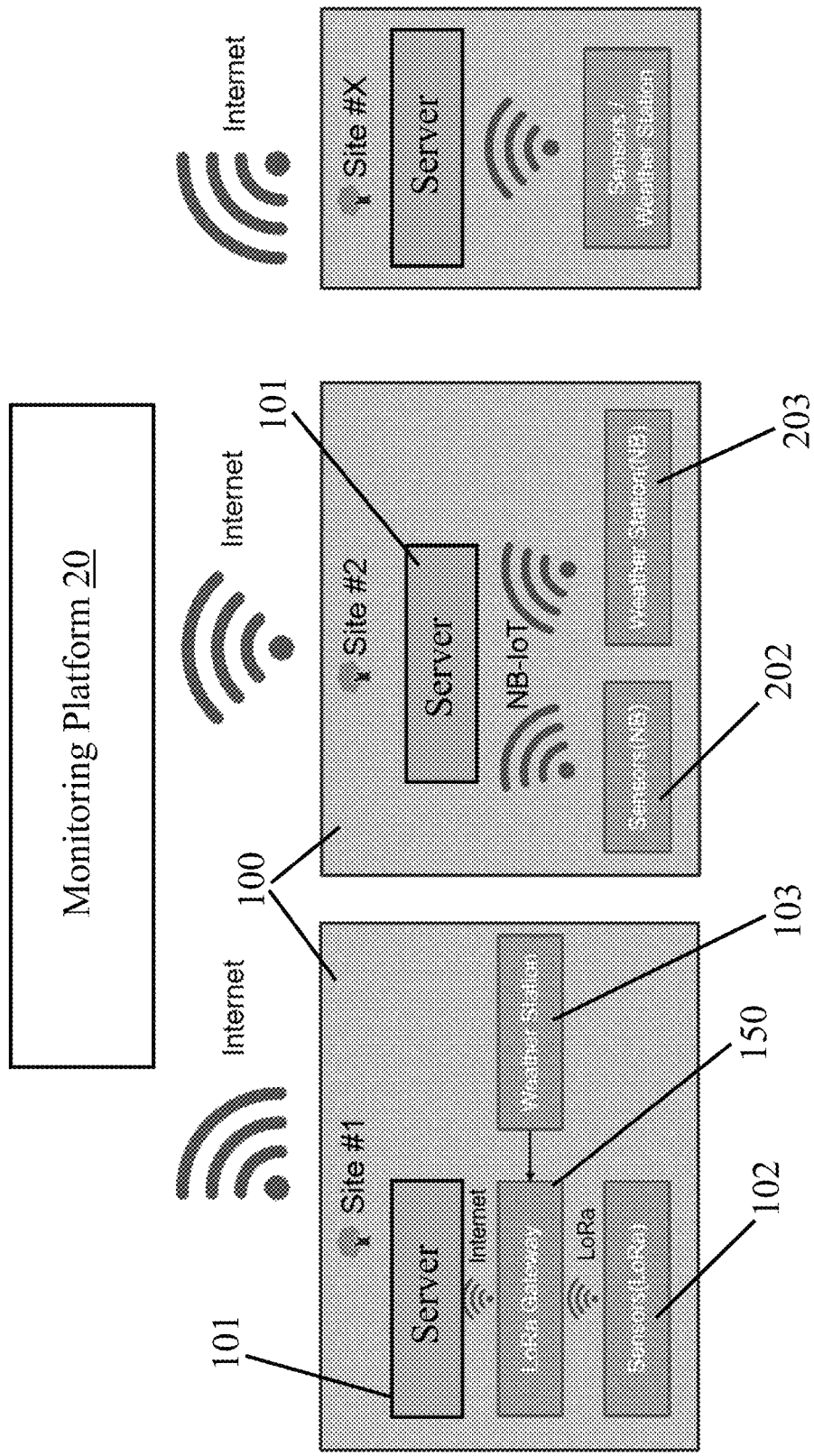
FIG. 2 shows a diagram of the system including multiple areas each containing a network of trees.
Figure 4:
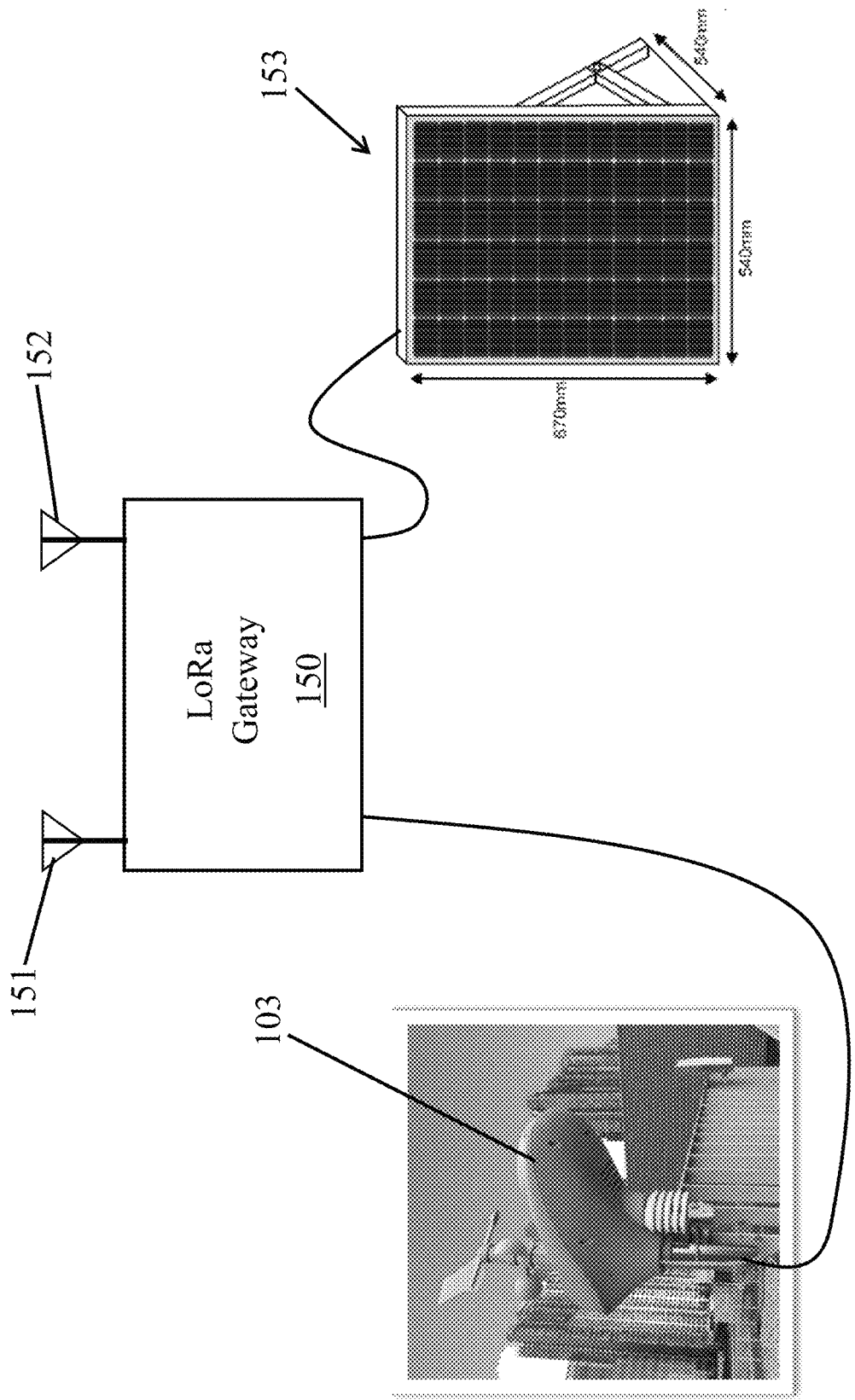
FIG. 4 shows an exemplary arrangement of a LoRa gateway and local weather station of the system according to FIG. 2.

In an embodiment, a LoRaWAN™ sensor module network may be established by connecting one or more LoRaWAN™ enabled sensor modules 102 to a gateway, i.e., LoRa gateway 150, as shown in FIG. 2 and FIG. 4. Preferably, the LoRa gateway 150 would be located in an outdoor environment for optimizing signal reception and transmission strength. The LoRa gateway 150 includes a LoRa antenna 151 configured for establishing wireless communication with the sensor modules. On the other hand, one or more LTE antennas 152 may be provided for wireless communication between the LoRa gateway 150 and the server 101 based on state-of-the-art broadband cellular network technologies, such as 4G or 5G protocols. Preferably, the LoRa gateway 150 may be self-powered by solar panels 153 and a built-in rechargeable battery for storage of electricity. Being capable of self-powering allows the LoRa gateway 150 to be deployed in virtually any location, especially in rural locations without electric power, within the service range of the cellular network.

Preferably, a weather observing device 103, i.e., a local weather station, may be provided for pairing with each of the LoRa gateway 150. Essentially, the weather observing device 103 is configured to monitor weather condition at the location of the LoRa gateway 150 and provide environmental variables to the server 101 for weather monitoring and performing weather analysis. For example, the weather observing device 103 may include various sensors for measuring a number of environmental variables such as, but not limited to, barometric pressure, temperature, wind speed and wind direction, etc. at the location of the LoRa gateway. The number of environmental variables collected may be used to represent the weather condition covering a region in the vicinity of the LoRa gateway 150 or the weather observing device 103 functioning as a local weather station. Preferably, the weather observing device 103 may be an individual device connected to the LoRa gateway 150 through a data cable such as a RS485 network cable. Alternatively, the weather observing device 103 may be integrated with the LoRa gateway 150 as a single self-powered device.

Figure 5:
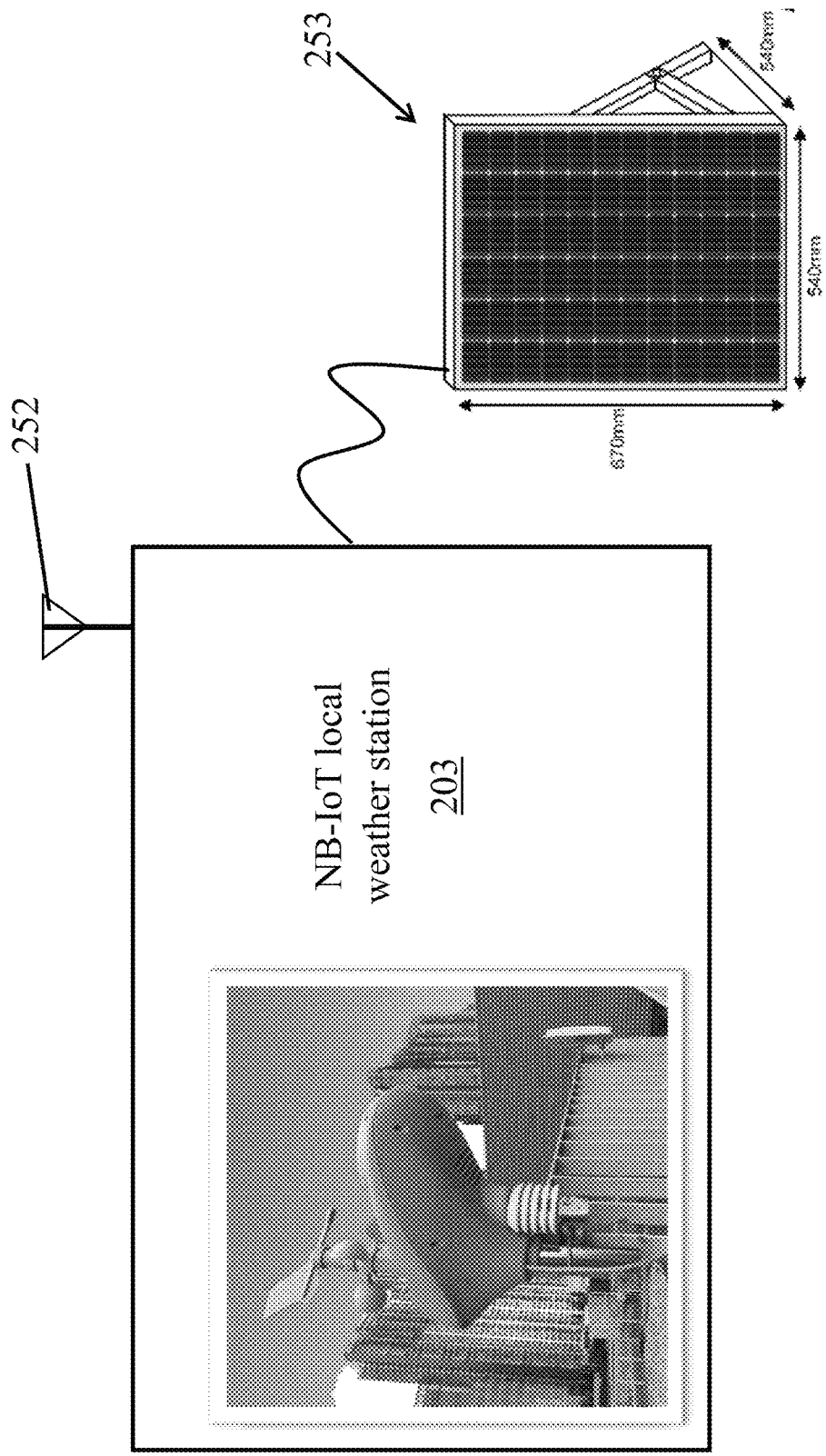
FIG. 5 shows an exemplary arrangement of a NB-IoT enabled local weather station of the system according to FIG. 2.

In another embodiment, a sensor module network may be established by connecting one or more NB-IoT enabled sensor modules 202 directly to dedicated NB-IoT enabled data receiver connected to the server 101, which the data receiver utilizes the same NB-IoT protocol. The advantages of utilizing NB-IoT enabled sensor module network include low latency and stronger security due to the adoption of 128 to 256-bit 3GPP data encryption, as compared to AES 128-bit data encryption for LoRaWAN™ protocol. Furthermore, as shown in FIG. 2, direct communication links can be established between the sensor modules 202 and the dedicated data receiver (not shown) without requiring a gateway. Referring to FIG. 5, a NB-IoT enabled weather observing device 203 may be deployed within the service range of the data receiver for obtaining environmental variables in individual regions. The NB-IoT enabled weather observing device 203 communicate with the data receiver directly using the NB-IoT protocol via a NB-IoT antenna 252, in which the data transfer is less likely to be interfered by cellular network traffic and internet traffic. Preferably, the NB-IoT enabled weather observing device 203 may be self-powered by solar panels 253 and a built-in rechargeable battery for storage of electricity.

Preferably, the system 100 may be arranged to have one or more LoRa gateways 150 set up in different locations, with each covering an area or a region containing a plurality of trees 10 attached with one or more sensor modules 102. A weather observing device 103 may be connected with each of the LoRa gateways 150 for providing weather related readings or measurements to the system 100 for real time data collections. The monitoring platform 20 may be established for performing monitoring and analysing of the data received from the sensor modules and weather observing device through an online web-based platform connected to the server. In particular, the monitoring platform 20 may be executed on mobile devices such as tablet computers, laptops or smartphones.

For example, the monitoring platform 20 may be configured to display the various data in graphical formats, such as an interactive map showing the location of each of the sensor modules 102, 202, weather observing devices 103, 203 and the LoRa gateways 150. On the interactive map, each of the weather observing devices 103, 203 may be indicated with the environmental variables such as barometric pressure, temperature, wind speed and wind direction, etc., representing a localized weather condition in the specific location. Reading or measuring of the environmental variables by a weather observing devices 103, 203 may be performed regularly according to a predetermined time interval. Preferably, the time interval can be changed according to the one or more of the environmental variables reaching one or more thresholds. For example, if wind speed has exceeded 50 km/h in a previous reading, the system 100 may shorten the time interval in order to more closely monitor the change in weather conditions as wind intensifies. Similarly, the sensor modules 102, 202 attached to the trees 10 are configured for obtaining tilt angle data from the sensors on a regular basis. The time interval for refreshing the data can be shortened according to the change in local weather conditions determined by the weather observing devices 103, 203. Alternatively, the system 100 may be configured to obtain local weather data, such as but not limited to, barometric pressure, temperature, wind speed and wind direction, from a weather observing authority or any related source, and change the time interval for refreshing the data accordingly, so as to more closely monitor the inclination conditions of the trees 10 within the network for improving accuracy. In an embodiment, the system 100 may be configured to obtain data from the sensor modules 102, 202 and/or the weather observing devices 103, 203 continuously and in real time to reduce delays and enhance accuracy.

Based on the tilt angle data obtained from the sensor modules attached to the trees 10, the system 100 would be able to determine or detect one or more abnormalities exhibit by one or more trees 10, including excessive swing, excessive horizontal or vertical displacement, excessive tilt or excessive vibration, etc. Preferably, the system 100 is further configured for determining, based on the tilt angle data from the one or more sensor modules, whether or not one or more trees have fallen and also the direction of each of the fallen trees. For example, the monitoring platform 20 may be configured to indicate to the management personnel one or more trees 10 exhibiting one or more abnormalities and issue one or more warnings of potential tree failures or hazards. In an event that the system 100 determines one or more trees 10 have fallen, the monitoring platform 20 may also indicate one or more tree failure alerts to the management personnel. For example, the monitoring platform 20 may also indicate on the interactive map a graphical representation of one or more fallen trees showing the directions which the trees have fallen, and whether the one or more fallen trees would have blocked any passage way such as a road or a pedestrian passageway. With the present system 100 in place, management personnel would be able to react in due time to prevent tree hazards or to follow up after a tree failure.

In an embodiment, the system may be configured to store the obtained data in a centralized data management system on the server. Based on the tilt angle data obtainable from the one or more sensor modules for each of the trees, the system may be configured to identify trees which are more susceptible to strong winds and tend to have a higher chance of failing. The tilt angle data and weather statistics obtained by the system may be further processed and form a big data database for data mining purposes.

It should be understood that although the specification is described in terms of embodiments, not every embodiment includes only a single technical solution. This description of the specification is merely for the sake of clarity. Those skilled in the art should regard the specification as a whole, and the technical solutions in the embodiments can also be combined appropriately to form other embodiments that can be understood by those skilled in the art. However, the protection scope of the present invention is defined by the appended claims rather than the foregoing description, and it is therefore intended that all changes that fall within the meaning and scope of equivalency of the claims are included

What is claimed is:

1. A system for monitoring stability of trees in an area comprising:
   a server;
   one or more sensor modules being attached to each of the trees, configured for obtaining tilt angle data pertaining to inclination of at least a portion of the said tree and relaying the tilt angle data to the server;
   a weather observing device connected to the server, for obtaining localized environmental variables representing a local weather condition in the area; and
   a monitoring platform connected with the server, configured for storing and processing the tilt angle data;
   wherein the monitoring platform is configured to display an interactive map;
   wherein the system is configured for monitoring, based on the tilt angle data and the environmental variables, the inclination of the trees, and identifying one or more abnormalities and tree failures for one or more of the trees, and indicating through the monitoring platform the one or more abnormalities and tree failures; and
   wherein, on the interactive map, the monitoring platform indicates one or more graphical representations of one or more fallen trees showing directions in which the one or more fallen trees have fallen, and whether the one or more fallen trees have blocked a passage way.

2. The system for monitoring stability of trees according to claim 1, wherein the one or more abnormalities of one or more of the trees comprise one or more of back and forth movement, horizontal or vertical displacement, tilt or vibration, each beyond a respective threshold.

3. The system for monitoring stability of trees according to claim 1, wherein the weather observing device comprises one or more sensors for determining one or more of the following: barometric pressure, humidity of air, wind speed, wind direction and temperature.

4. The system for monitoring stability of trees according to claim 1, wherein the one or more sensor modules are interconnected and connected with a data receiver based on Narrowband Internet of Things protocol (NB-IoT).

5. The system for monitoring stability of trees according to claim 1, wherein the one or more sensor modules are connected with at least one LoRa gateway through a Low Power Wide Area Networking protocol (LPWAN).

6. The system for monitoring stability of trees according to claim 5, wherein the LoRa gateway and the weather observing device are integrated into a single device.

7. The system for monitoring stability of trees according to claim 5, wherein the LoRa gateway connects to an internet utilizing an LTE network communication protocol.

8. The system for monitoring stability of trees according to claim 1, wherein the one or more sensor modules are self-powered by one or more onboard solar panels and a non-rechargeable battery.

9. The system for monitoring stability of trees according to claim 1, wherein the weather observing device is self-powered by one or more onboard solar panels and a rechargeable battery.

10. The system for monitoring stability of trees according to claim 1, wherein each of the one or more sensor module comprises one or more of the following sensors: acceleration sensors, and magnetic field sensors.

11. The system for monitoring stability of trees according to claim 1, wherein one of the sensor modules is attached to a first portion of a said tree, and another of the sensor modules is attached to a second portion of the said tree.

12. The system for monitoring stability of trees according to claim 11, wherein the first portion is an upper portion of the trunk of the said tree, and the second portion is a lower portion of the trunk, the system is configured for determining a tree failure by comparing the tilt angle data obtained by the first and second portions of the said tree.

13. The system for monitoring stability of trees according to claim 1, wherein each of sensor modules comprises a 9-axis sensor for collecting data pertaining to one or more of the following: acceleration, magnetic orientation, and angular velocity.

14. The system for monitoring stability of trees according to claim 13, wherein the system is configured for determining the directions in which the one or more fallen trees have fallen according to the tilt angle and magnetic orientation with respect to a tree failure.

15. The system for monitoring stability of trees according to claim 14, wherein the system is configured for indicating one or more alerts through the monitoring platform in an event that one or more tree failures are determined.

16. The system for monitoring stability of trees according to claim 15, wherein the system is configured for indicating the one or more graphical representations of the one or more fallen trees according to the direction of fall determined based on the positioning data received from the one or more sensor modules.

17. The system for monitoring stability of trees according to claim 1, wherein the system is configured to obtain the tilt angle data from the one or more sensor modules based on a time interval, the system shortens the time interval if one or more of the environmental variables exceed one or more thresholds.

18. The system for monitoring stability of trees according to claim 17, wherein the system is configured for issuing one or more warnings for potential tree hazards through the monitoring platform in an event that one or more abnormalities are determined.

19. The system for monitoring stability of trees according to claim 1, wherein the monitoring platform is accessible by an Internet enabled tablet pc, laptop or smartphone.

20. The system for monitoring stability of trees according to claim 1 wherein the server is configured for storing the tilt angle data obtained for each of the trees for forming a database for performing analysis on tree failures with respect to local weather conditions.

* * * * *